United States Patent [19]

Kawabata et al.

[11] Patent Number: 5,054,375
[45] Date of Patent: Oct. 8, 1991

[54] PISTON FOR INTERNAL COMBUSTION ENGINE

[75] Inventors: Yasuhiro Kawabata, Anjo; Soichi Hara, Toyota; Shirou Machida, Okazaki; Hiroshi Kageyama, Toyota, all of Japan

[73] Assignee: Aisin Seiki Kabushiki, Kariya, Japan

[21] Appl. No.: 540,638

[22] Filed: Jun. 19, 1990

[30] Foreign Application Priority Data

Jun. 19, 1989 [JP] Japan .................................. 1-156378

[51] Int. Cl.$^5$ ........................................... F01B 31/00
[52] U.S. Cl. ....................................... 92/126; 92/208; 92/225; 92/227; 92/233; 123/193 P
[58] Field of Search .................. 92/126, 158, 186, 208, 92/225, 227, 233, 228, 229, 177; 123/193 P; 29/888.04

[56] References Cited

U.S. PATENT DOCUMENTS 3,463,057  8/1969  Packard et al. ....................... 92/208
4,274,372  6/1981  Kelm et al. .
4,794,848  1/1989  Melchior ............................... 92/208

FOREIGN PATENT DOCUMENTS 894542   12/1944  France ................................... 92/208
1393921  5/1988   U.S.S.R. .......................... 123/193 P
877529   9/1961   United Kingdom .................. 92/126

Primary Examiner—Edward K. Look
Assistant Examiner—Thomas Denion
Attorney, Agent, or Firm—Banner, Birch, McKie & Beckett

[57] ABSTRACT

A piston comprises a crown part, a piston under part, a first shoulder at a thrust side formed between the crown part and the piston under part, a second shoulder at an anti-thrust side formed between the crown part and the piston under part, a first in-low part at the thrust side formed in the piston under part, and a second in-low part at the anti-thrust side formed in the piston under part, wherein a thickness of the first shoulder is formed thinner than a thickness of the second shoulder, and a height of the first in-low part is formed smaller than a height of the second in-low part.

4 Claims, 3 Drawing Sheets

Thrust direction ← | → Anti-thrust direction

PISTON FOR INTERNAL COMBUSTION ENGINE

BACKGROUND OF THE INVENTION

1. Field of the Invention

The present invention relates to a piston and more particularly to a piston for an internal combustion engine.

2. Description of the Related Art

A conventional piston designed to reduce piston slap and prevent the seizure of a skirt part or a ring is disclosed in Japanese Patent Publication No. 58(1983)-25861, and is shown in FIGS. 5, 6. The piston 30 comprises a land part 31 and a skirt part 32. The diameter of the land part 31 is smaller than the diameter of the lower portion of the skirt part 32. The diameters of the skirt part 32 to each side of the axis of pin hole 33 (i.e., spaced vertically from the axis of the pin hole as oriented in FIG. 5) is smaller than the diameter on line C—C, which is perpendicular to the axis of pin hole 33. The piston 30 has an oval (i.e., elliptical) shape in the horizontal cross-section (as oriented in FIG. 5) in both the land and skirt parts 31, 32. The axis B—B of the land part 31 is offset from the axis A—A of the skirt part 32 about 30~60 μm; that is, the center of the ovality of the land 31 is offset to the thrust side from the center of the ovality of the skirt part 32. Hence, at the slap (i.e., when the under part or lower portion of the skirt part 32 hits the bore sidewall after the upper dead point by the explosion) the head of the piston 30 slants to the anti-thrust side and reduces the clearance of the land part 31 on the thrust side. Therefore, the reduction of the blowby gas and the seizure of the land part 31 (and the ring) or the skirt part 32 as a result of the reduction of the temperature are prevented.

However, at the piston slap (especially at the upper dead point by the explosion) the set position of the piston 30 is changed by the offset of the pin. The more the pin hole 33 is offset to the thrust side, and the more the piston is biased to the anti-thrust side from the under part or lower portion of the skirt part 32, the more the skirt 32 hits the bore on the thrust side, and the more the hit point moves to the upper side of the cylinder 34. If the ovality of the land part 31 is offset to the thrust side as compared to the skirt part 32, the pin hole 33 has the effect of being biased in the thrust offset amount of the land part 34 under the expansion of the piston 30. As shown in FIG. 6, the shoulder 31a of the land part 31 and the shoulder 32a of the skirt part 32 hit the sidewall of the bore hard. Thus, even if the pin hole 33 is biased more to the thrust side and the skirt part 32 hits the bore of the thrust side along the under part in order to cancel the effect of the offset to the anti-thrust side, the piston 30 still rolls and hits the bore sidewall in a certain range of its own from the under part to the upper part of the skirt. Therefore, it is unavoidable, that the shoulders 31a and 32a of the land and the shoulder hit the bore of the cylinder 34 hard. Furthermore, because the temperature of the land part 31 is higher than that of the skirt part 32 under the driving of the engine, the heat expansion of the land part 31 is more than that of the skirt part 32 and the offset side of the land part 31 hits the side of the bore harder. Therefore, contrary of the description of the prior art, the prior art unsatisfactorily prevents the slap and seize of the piston.

SUMMARY OF THE INVENTION

Accordingly, it is a primary object of the present invention to provide a piston which reduces piston slap and prevents seizure of the piston within a cylinder.

The above and other objects are achieved according to the present invention by a piston which comprises a crown part, a piston under part, a first shoulder at a thrust side formed between the crown part and the piston under part, a second shoulder at an anti-thrust side formed between the crown part and the piston under part, a first in-low part at the thrust side formed in the piston under part, and a second in-low part at the anti-thrust side formed in the piston under part, wherein a thickness of the first shoulder is formed thinner than a thickness of the second shoulder, and a height of the first in-low part is formed smaller than a height of the second in-low part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

Figure 1:
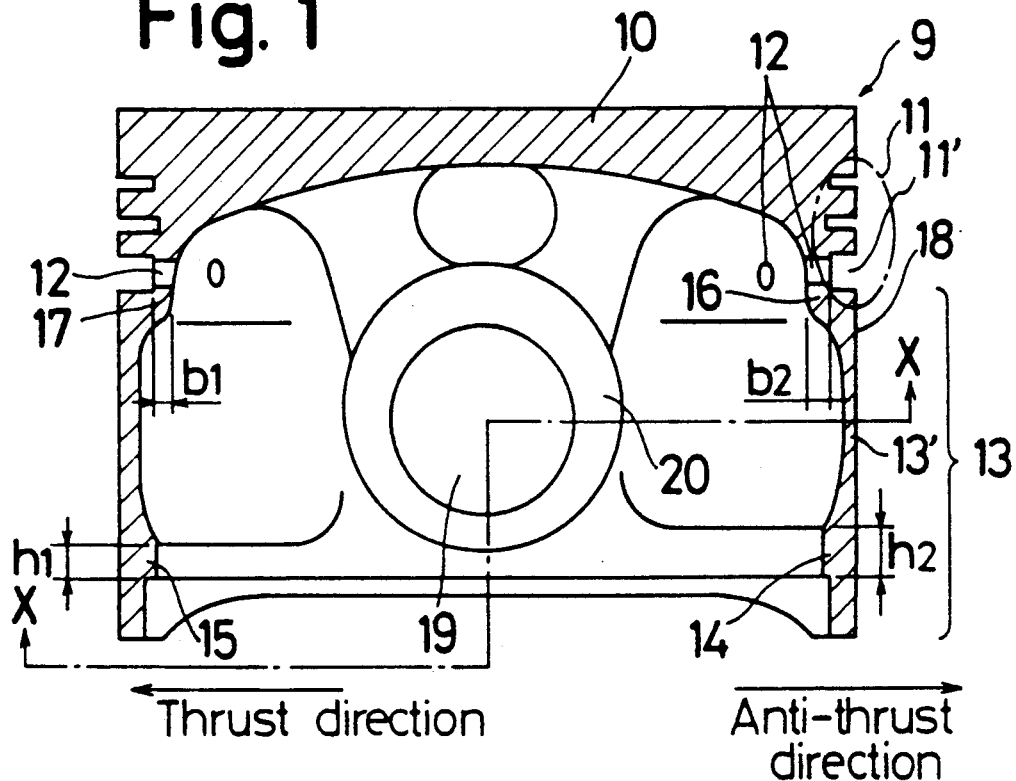
FIG. 1 is a cross-sectional view of a piston according to the invention.

A piston 9 (FIGS. 1 and 2) comprises a crown part 10 and a piston under part 13. A ring land part 11 is formed between the crown part 10 and the piston under part 13. An oil ring groove 11' is formed on an under part thereof. A leak hole 12 to the interior of the piston 9 is formed in the bottom (i.e., the inner surface) of the oil ring groove 11'. In-low parts 14, 15 are formed on the inner surface of the lower portion of the piston's skirt part 13' in order to secure the stiffness of the skirt. In-low part 14 is formed on the anti-thrust side and in-low part 15 is formed on the thrust side. The height h1 of the in-low part 15 of the thrust side is smaller than the height h2 of the in-low part 14 of the anti-thrust side. Hence, the in-low parts 14, 15 are asymmetrically formed in the piston. The thickness b1 of the shoulder 17 between the oil ring groove 11' and the upper part 18 of the skirt 13' at the thrust side is thinner than the thickness b2 of the opposing shoulder therebetween at the anti-thrust side. The piston, again, is formed in an asymmetrical manner. On the inner side of the piston, bosses 20 define a hole 19 through which a pin (not shown in FIGS. 1-2) is inserted. Side cut parts 21 are formed on the outer side of the piston 9.

Figure 2:
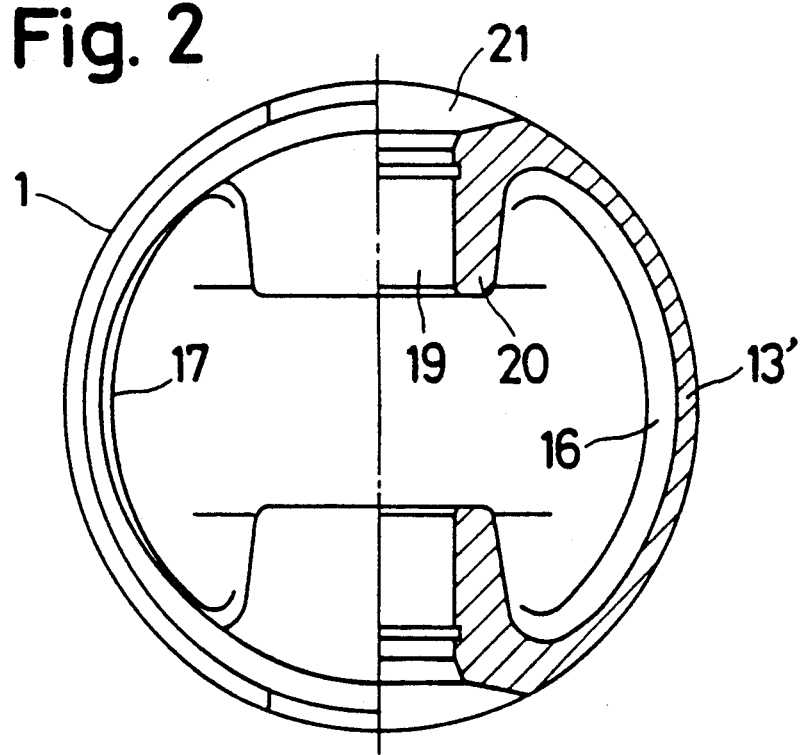
FIG. 2 is a fragmentary sectional view along line X—X in FIG. 1.

After the piston 9 goes through the upper dead point of its movement by the explosion, the piston 9 rotates and moves from the bore wall of the anti-thrust side around the pin hole 19 such that it hits the bore wall of the thrust side. This action causes piston slap and the corresponding hit-noise to occur. In order to prevent the noise, clearance between the skirt 13' and the bore must be reduced. For example, because an aluminum piston expands about twice the amount of an iron cylinder when heated, the clearance at the cool condition must be set so that seizure of the piston does not occur when the engine is driven (i.e., becomes hot). Therefore, the slap noise occurs more easily at the cooling condition because of the required increase in clearance between the piston and the bore to prevent seizure. Furthermore, when the engine is driven at high power, the heat received by the top of the crown part 10 tends to increase. In order to dissipate the heat rapidly to the skirt side and out of the piston, the oil leak construction is changed from a conventional oil slit structure (not shown) to the oil leak hole structure 12 shown in FIG. 1. The heat of the crown flows into the piston with the oil via leak hole 12. In the piston, the new oil is always supplied so that the heat is rapidly removed. Therefore, it is difficult to obtain a piston satisfying the reduction of the slap and the prevention of the seizure, because a greater clearance between the piston and the bore reduces the risk of seizure but increases the effects of slap and a smaller clearance reduces the effects of slap but increases the risk of seizure. For preventing slap, it is necessary to secure the stiffness of the skirt in the circular direction and to abolish the rapid heat change of the skirt, in addition to using the oil leak hole construction 12. As shown in FIG. 2, the thickness of the skirt sidewalls between the defined opening of pin hole 19 is at a minimum in the extreme thrust and anti-thrust directions, and gradually increases as the wall approaches the pin hole openings. The skirt walls are connected to the pin bosses 20 through an r-form construction. Hence, the stiffness of the skirt in the thrust—anti-thrust directions is decreased as a whole, relative to a conventional uniform piston skirt wall. The decreased stiffness makes the piston slightly more flexible and therefore less likely to seize in the bore.

Figure 5:
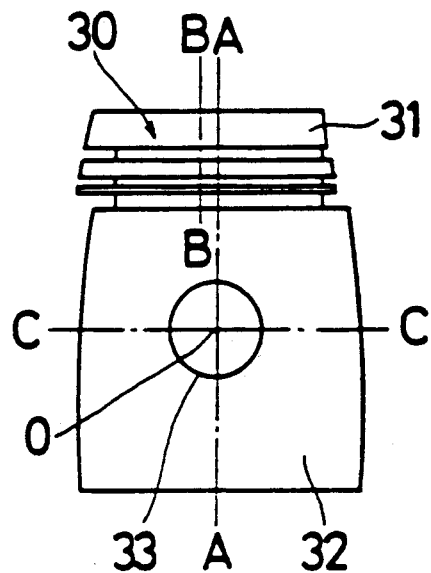
FIG. 5 is an elevational view of a conventional piston.
Figure 6:
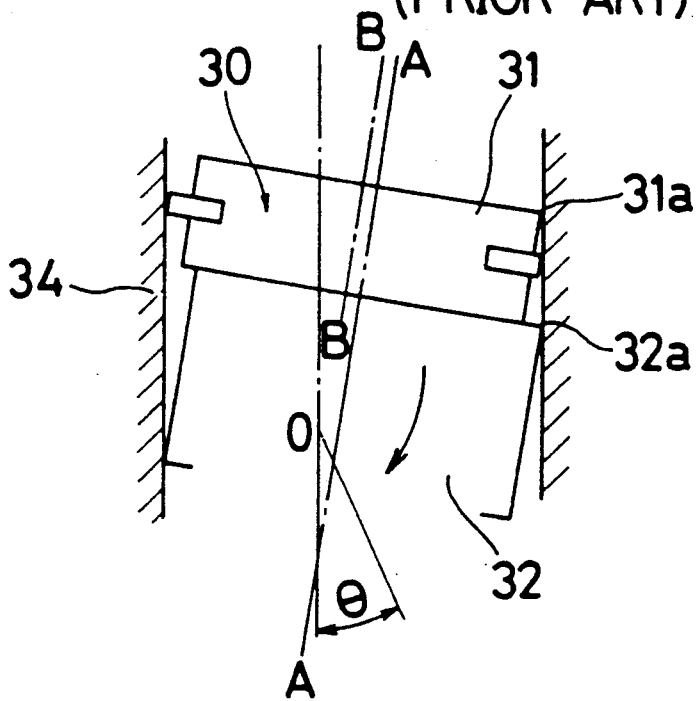
FIG. 6 is an cross-sectional and explanational view of FIG. 5.

As mentioned above, the thicknesses of the shoulders and the heights or the thicknesses of the in-low parts are formed asymmetrically on the interior of the piston skirt. Therefore, because the desirable structure is formed on the interior of the piston, the external structure of the piston is unaffected. The clearance between the skirt and the bore can, then, be reduced as compared to one of the conventional pistons (FIGS. 5 and 6) having the offset land part. Further, the stiffness of the in-low part 14 on the anti-thrust side is greater than the stiffness of the in-low part 15 on the thrust side. Thus, the stiffness of the in-low part on the anti-thrust side moderates the impact of the piston slap and reduces the slap noise. Further, the lower stiffness of the thrust side of the piston reduces the impact and the corresponding noise. After that, the shoulder on the thrust side hits the bore. Yet, because the thickness of the shoulder at the thrust side is thinner than the one at the anti-thrust side, the stiffness is low, the impact is small, and the hit noise is reduced. On the other hand, even though the stiffness of the skirt under part is secured by the in-low parts 14, 15—and thereby establishes a potentially larger expansion factor—the clearance between the piston and bore is smaller than the conventional piston, because the temperature of the in-low parts is kept lower than the crown's by the oil leak hole structure 12. Hence, even if the clearance between the piston and the bore is smaller than a conventional piston, seizure due to a lack of oil to dissipate the heat from the piston does not occur. Therefore, the slap noise is reduced and the seizure is prevented.

Figure 3:
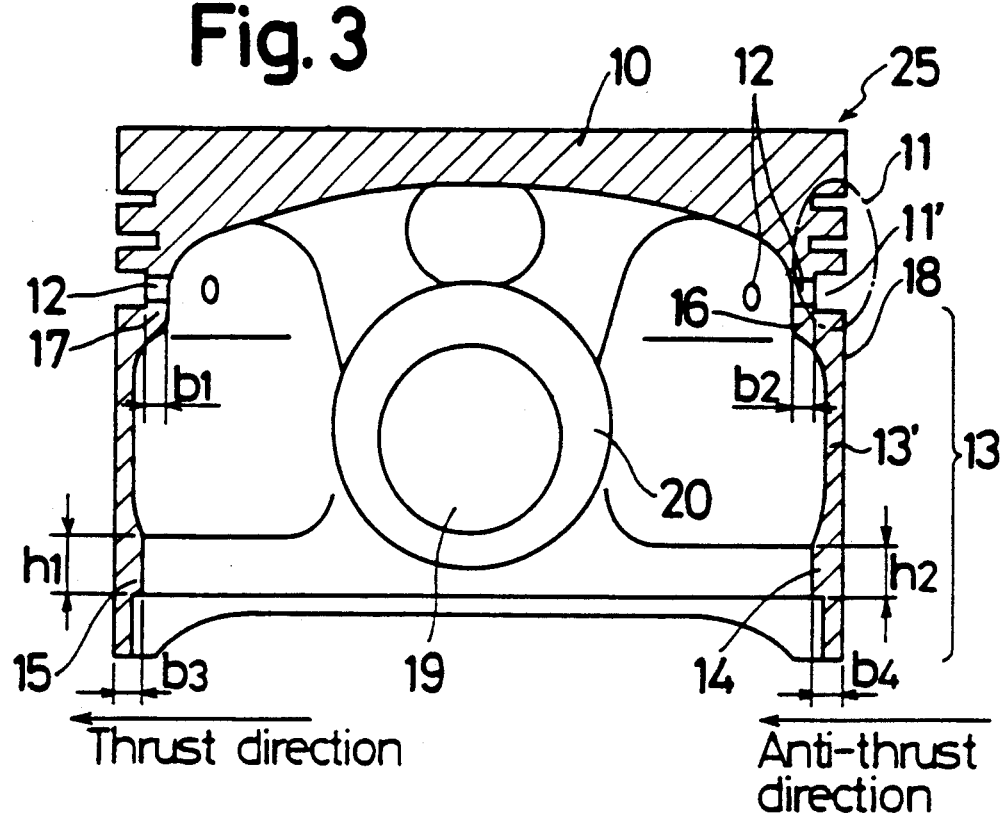
FIG. 3 is a view similar to FIG. 1, showing another embodiment according to the invention.

Next, referring to FIG. 3 which shows a piston 25 of a second embodiment according to the present invention, only the construction which differs from the first embodiment will be described hereinafter.

The height h1 of the in-low part 15 of the thrust side is the same as the height h2 of the in-low part 14 of the anti-thrust side. The thickness b3 of the in-low part 15 at the thrust side is thinner than the thickness b4 of the in-low part 14 at the anti-thrust side to achieve the asymmetrical construction.

Figure 4:
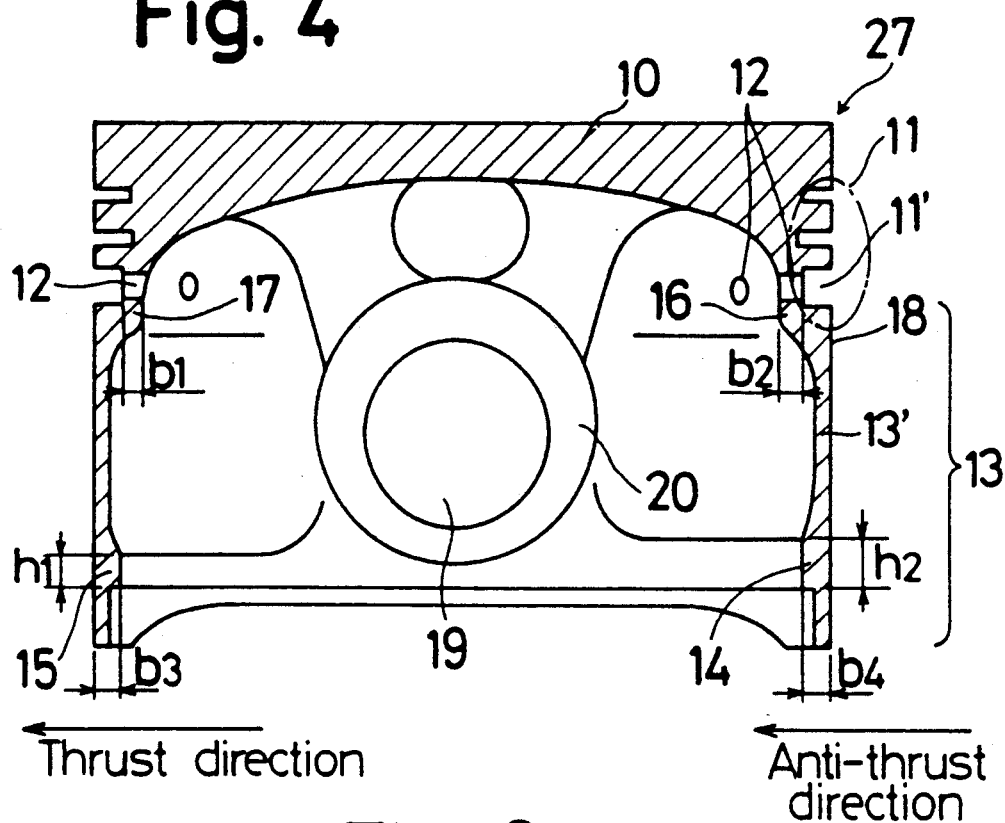
FIG. 4 is a view similar to FIG. 1, showing a third embodiment according to the invention.

Next, referring to FIG. 4 which shows a piston 27 of a second embodiment according to the present invention, only the construction which differs from the first embodiment will be described hereinafter.

The height h1 of the in-low part 15 of the thrust side is smaller than the height h2 of the in-low part 14 of the anti-thrust side. Also, the thickness b3 of the in-low part 15 at the thrust side is thinner than the thickness b4 of the in-low part 14 at the anti-thrust side. The asymmetrical construction is thereby acheived through both features in this embodiment.

Obviously, numerous modifications and variations of the present invention are possible in light of the above teachings. It is therefore to be understood that within the scope of the appended claims, the invention may be practiced otherwise than as specifically described herein.

What is claimed is:

1. A piston comprising:
   a crown part;
   a piston under part;
   a first shoulder at a thrust side formed between the crown part and the piston under part;
   a second shoulder at an anti-thrust side formed between the crown part and the piston under part;
   a first in-low part at the thrust side formed in the piston under part; and
   a second in-low part at the anti-thrust side formed in the piston under part;
   wherein a thickness of the first shoulder is formed thinner than a thickness of the second shoulder, and
   a height of the first in-low part is formed smaller than a height of the second in-low part.

2. A piston as set forth in claim 1, further comprising a thickness of the first in-low part is formed the same as a thickness of the second in-low part.

3. A piston as set forth in claim 1, wherein a thickness of the first in-low part is formed thinner than a thickness of the second in-low part.

4. A piston comprising:
   a crown part;
   a piston under part;
   a first shoulder at a thrust side formed between the crown part and the piston under part;
   a second shoulder at an anti-thrust side formed between the crown part and the piston under part;
   a first in-low part at the thrust side formed in the piston under part; and
   a second in-low part at the anti-thrust side formed in the piston under part;
   wherein a thickness of the first shoulder is formed thinner than a thickness of the second shoulder,
   a height of the first in-low part is formed at the same height as a height of the second in-low part, and
   a thickness of the first in-low part is formed thinner than a thickness of the second in-low part.

* * * * *